US011470112B2

(12) United States Patent
Gingold et al.

(10) Patent No.: US 11,470,112 B2
(45) Date of Patent: Oct. 11, 2022

(54) DETECTION AND MITIGATION OF DENIAL OF SERVICE ATTACKS IN DISTRIBUTED NETWORKING ENVIRONMENTS

(71) Applicant: Oracle International Corporation, Redwood Shores, CA (US)

(72) Inventors: Jesse Gingold, Boynton Beach, FL (US); Jaiminkumar Kantilal Patel, Boynton Beach, FL (US); Karl Georg Brumund, Markham (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/107,573

(22) Filed: Nov. 30, 2020

(65) Prior Publication Data
US 2022/0174090 A1    Jun. 2, 2022

(51) Int. Cl.
*G06F 21/00*      (2013.01)
*H04L 9/40*       (2022.01)
(Continued)

(52) U.S. Cl.
CPC ......... *H04L 63/1458* (2013.01); *H04L 43/08* (2013.01); *H04L 43/16* (2013.01);
(Continued)

(58) Field of Classification Search
CPC . H04L 63/1425; H04L 63/1458; H04L 67/10; H04L 51/22; H04L 47/2483
See application file for complete search history.

(56) References Cited

U.S. PATENT DOCUMENTS 8,510,826 B1   8/2013  Reams, III et al.
8,832,831 B2   9/2014  Chesla et al.
(Continued)

OTHER PUBLICATIONS

"DDoS Protection for Business Critical Systems", Flowmon Networks, Available Online at-https://www.flowmon.com/en/products/software-modules/ddos-defender, Accessed from internet on Sep. 8, 2020, 8 pages.
(Continued)

*Primary Examiner* — Yves Dalencourt
(74) *Attorney, Agent, or Firm* — Kilpatrick Townsend & Stockton LLP

(57) ABSTRACT

Techniques for detecting and mitigating Denial of Service (DoS) attacks in distributed networking environment are disclosed. In certain embodiments, a DoS detection and mitigation system is disclosed that automatically monitors and analyzes network traffic data in a distributed networking environment using a set of pre-defined threshold criteria. The system includes capabilities for automatically invoking various mitigation techniques that take actions on malicious traffic based on the analysis and the pre-defined threshold criteria. The system includes capabilities for automatically detecting and mitigating "outbound" DoS attacks by analyzing network traffic data originating from an entity within the network to a public network (e.g., the Internet) outside the network as well as detect and mitigate "east-west" DoS attacks by analyzing network traffic data originating from a first entity located in a first data center of the network to a second entity located in a second data center of the network.

20 Claims, 10 Drawing Sheets

(51) Int. Cl.
  *H04L 67/10* (2022.01)
  *H04L 43/16* (2022.01)
  *H04L 43/08* (2022.01)
  *H04L 47/2483* (2022.01)
  *H04L 51/42* (2022.01)

(52) U.S. Cl.
  CPC .......... *H04L 47/2483* (2013.01); *H04L 51/42* (2022.05); *H04L 63/1425* (2013.01); *H04L 67/10* (2013.01); *H04L 2463/141* (2013.01)

(56) References Cited

U.S. PATENT DOCUMENTS

| | | | |
|---|---|---|---|
| 9,253,206 B1* | 2/2016 | Fleischman | ......... H04L 63/1416 |
| 2006/0272018 A1 | 11/2006 | Fouant | |
| 2015/0264083 A1* | 9/2015 | Prenger | ............... H04L 63/1408 |
| | | | 726/23 |
| 2016/0080412 A1 | 3/2016 | Smith et al. | |
| 2016/0381069 A1* | 12/2016 | Chesla | .................... H04L 45/64 |
| | | | 726/23 |
| 2017/0223046 A1* | 8/2017 | Singh | ................. H04L 63/1491 |
| 2017/0237767 A1* | 8/2017 | George | ............... H04L 63/1458 |
| | | | 726/23 |
| 2018/0183714 A1* | 6/2018 | Hay | ..................... H04L 41/0816 |
| 2019/0068626 A1* | 2/2019 | Compton | ............ H04L 63/1416 |
| 2019/0334945 A1* | 10/2019 | O'Hara | ............... H04L 63/1416 |
| 2021/0075800 A1* | 3/2021 | Paraskevas | ............. H04W 4/48 |

OTHER PUBLICATIONS

"DDoS Protection for High-Speed Networks", Flowmon Networks, Available Online at-https://www.flowmon.com/en/solutions/ddos-protection/ddos-protection, Accessed from internet on Sep. 8, 2020, 6 pages.

"Flowmon 8.01 and Flowmon DDoS Defender 3.0 News", Flowmon Networks, Flowmon 8.01 Release Document, 2016, 5 pages.

"Hybrid DDoS Defense for the Data Center", Overview, F5 Networks, 4 pages.

"Manage Azure DDoS Protection Standard Using the Azure Portal", Microsoft Docs, Accessed from internet on Sep. 8, 2020, 11 pages.

"Mitigating DDoS Attacks in Zero Seconds with Proactive Mitigation Controls", Akamai, 11 pages.

"NETSCOUT Arbor Edge Defense", Solution Brief, 4 pages.

"Prolexic Flow-Based Monitoring", Akamai, 2 pages.

"Prolexic Routed", Akamai, 2 pages.

Birchard, "Akamai's Prolexic Platform Completes Fifth Generation Upgrade", The Akamai Blog, Mar. 23, 2020, 5 pages.

Burns, "What's New with Prolexic", The Akamai Blog, Apr. 16, 2018, 7 pages.

Felter, "Best Practices for How to Prevent DDoS Attacks", vXchnge, Aug. 9, 2019, 7 pages.

Lunter, "Dynamic Baselining and Adaptive Threshold in DDoS Defender", Flowmon Networks, Available Online at-https://www.flowmon.com/en/blog/dynamic-baselining-and-adaptive-threshold-in-ddos, Accessed from internet on Sep. 8, 2020, 7 pages.

Sparling, "Introducing Network Traffic Profiling in Prolexic", Akamai Developer, Mar. 4, 2019, 4 pages.

Vordos, "Mitigating Distributed Denial of Service Attacks with Multiprotocol Label Switching-Traffic Engineering KMPLS-TE)", Naval Postgraduate School, Dudley Knox Library, Available Online at-http://hdl.handle.net/10945/4817, Mar. 2009, 136 pages.

* cited by examiner

DETECTION AND MITIGATION OF DENIAL OF SERVICE ATTACKS IN DISTRIBUTED NETWORKING ENVIRONMENTS

BACKGROUND

Network security threats continue to be a huge problem with the rising popularity of cloud-based services. It is a serious issue for both consumers and providers of cloud-based services. One common type of network security threat is a Denial of Service (DoS) attack which is initiated by an attacker against a computer or a network of systems to deliberately restrict or prevent accessibility of resources to authorized users. Individual networks may be affected by DoS attacks or the infrastructure of a distributed computing environment hosted by the network's internet service provider (ISP) or cloud service provider (CSP) can be targeted, resulting in a loss of service. A particularly concerning type of DoS attack is a volumetric DoS attack that occurs when an attacker floods a network server with a high volume of communication traffic. The volume of traffic can be so large that the attacked entity is no longer able to process legitimate traffic in a timely manner. The monitoring of systems and/or services to detect malicious attacks especially in distributed computing environments is very essential. DoS detection and mitigation approaches have been developed that monitor network traffic and detect DoS attacks in such environments. However, these approaches are limited in their ability to effectively detect and reduce the impact of these types of attacks.

SUMMARY

This disclosure relates generally to detecting and mitigating DoS attacks in distributed networking environments. More specifically, but not by way of limitation, this disclosure describes techniques for monitoring and analyzing network traffic data in a distributed networking environment using a set of pre-defined threshold criteria. This disclosure additionally describes techniques for automatically invoking various mitigation techniques that take actions on malicious traffic based at least in part on the analysis and the pre-defined threshold criteria. The actions allow only valid traffic to be forwarded back to the network and route the malicious traffic to a quarantined environment, isolating it from production.

In one embodiment, a method for detecting and mitigating Denial of Service (DoS) attacks in a cloud services provider (CSP) network is disclosed. The method includes for a first entity deployed in a first region of the CSP network, monitoring, by a computer system (e.g., a DoS detection and monitoring system), a flow of network traffic data originating from the first entity and destined to a second entity remote from the first entity. In certain examples, the CSP network is configured to provision a set of infrastructure resources for deployment by at least the first entity in the first region of the CSP network. The method further includes determining, by the computer system, that the flow of network traffic data originating from the first entity exceeds a threshold value based on the monitoring. In certain examples, the threshold value identifies at least one network traffic data value related to the flow of network traffic data indicative of a Denial of Service (DoS) attack in the CSP network. The method then includes responsive to the determining, identifying, by the computer system, an action to be taken to mitigate the DoS attack in the CSP network and performing, by the computer system, the action to mitigate the DoS attack in the CSP network.

In certain embodiments, the monitoring includes analyzing a plurality of network traffic data values related to the flow of network traffic data from a cluster of internal routing devices within the CSP network and determining that the network traffic data value related to the flow of the network traffic data exceeds a first threshold value based on the analysis. In certain examples, the network traffic data value comprises at least one of a packet generation frequency or a packet size related to packets in the flow of network traffic data.

In certain examples, the method further comprises transmitting a first alert to a user of the CSP network based at least in part on determining that the network traffic data value related to the flow of network traffic data exceeds the first threshold value. In certain examples, the first alert is transmitted as an email message to a user of the CSP network.

In certain embodiments, monitoring the flow of network traffic data originating from the first entity comprises analyzing the plurality of network traffic data values related to the flow of network traffic data from the cluster of internal routing devices within the CSP network and based on the analysis, determining that the network traffic data value related to the flow of network traffic data exceeds a second threshold value. In certain examples, the second threshold value is greater than the first threshold value.

In certain examples, the method further comprises triggering an internal mitigation plan to mitigate the DoS attack based on determining that the network traffic data value related to the flow of network traffic data exceeds the second threshold value. In certain examples, the internal mitigation plan identifies a set of one or more actions to mitigate the DoS attack.

In certain embodiments, a first action in the set of one or more actions causes an instruction to be transmitted by the computer system to a cluster of internal routing devices within the CSP network to limit a rate of the flow of network traffic data from the first entity to the second entity. A second action comprises transmitting, by the computer system, an instruction to the cluster of internal routing devices to tag a prefix of the Internet Protocol address of the first entity to block the flow of network traffic data transmitted from the first entity to the second entity. A third action comprises an instruction transmitted by the computer system to the cluster of internal routing devices to divert the flow of network traffic data transmitted from the first entity to a Remote triggered Blackhole (RTBH).

In certain embodiments, the second entity is deployed in a second region of CSP network. The CSP network is configured to provision a set of infrastructure resources for deployment by the second entity in the second region. In certain embodiments, the second entity is an external entity deployed in a network external to the CSP network. In certain embodiments, the DoS attack comprises at least one of a volumetric DoS attack or a volumetric Distributed DoS attack in the CSP network.

BRIEF DESCRIPTION OF THE DRAWINGS

Features, embodiments, and advantages of the present disclosure are better understood when the following Detailed Description is read with reference to the accompanying drawings.

network that includes capabilities for detecting and mitigating an "inbound" Denial of Service (DoS) attack within the CSP network, according to certain embodiments.

Figure 2:
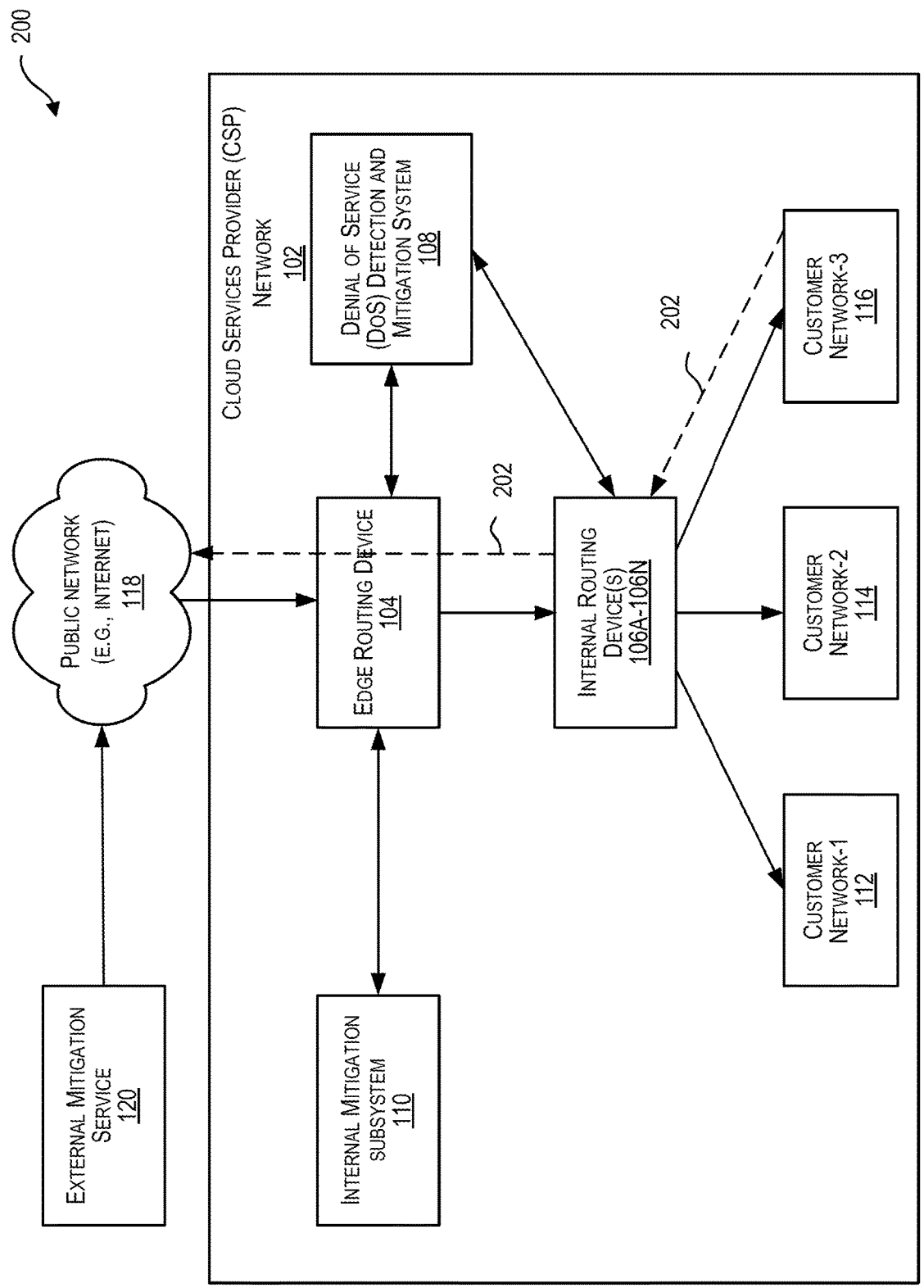

FIG. 2 is a high level diagram of a distributed environment showing a CSP network that includes capabilities for detecting and mitigating an "outbound" DoS attack within the CSP network, according to certain embodiments.

Figure 3:
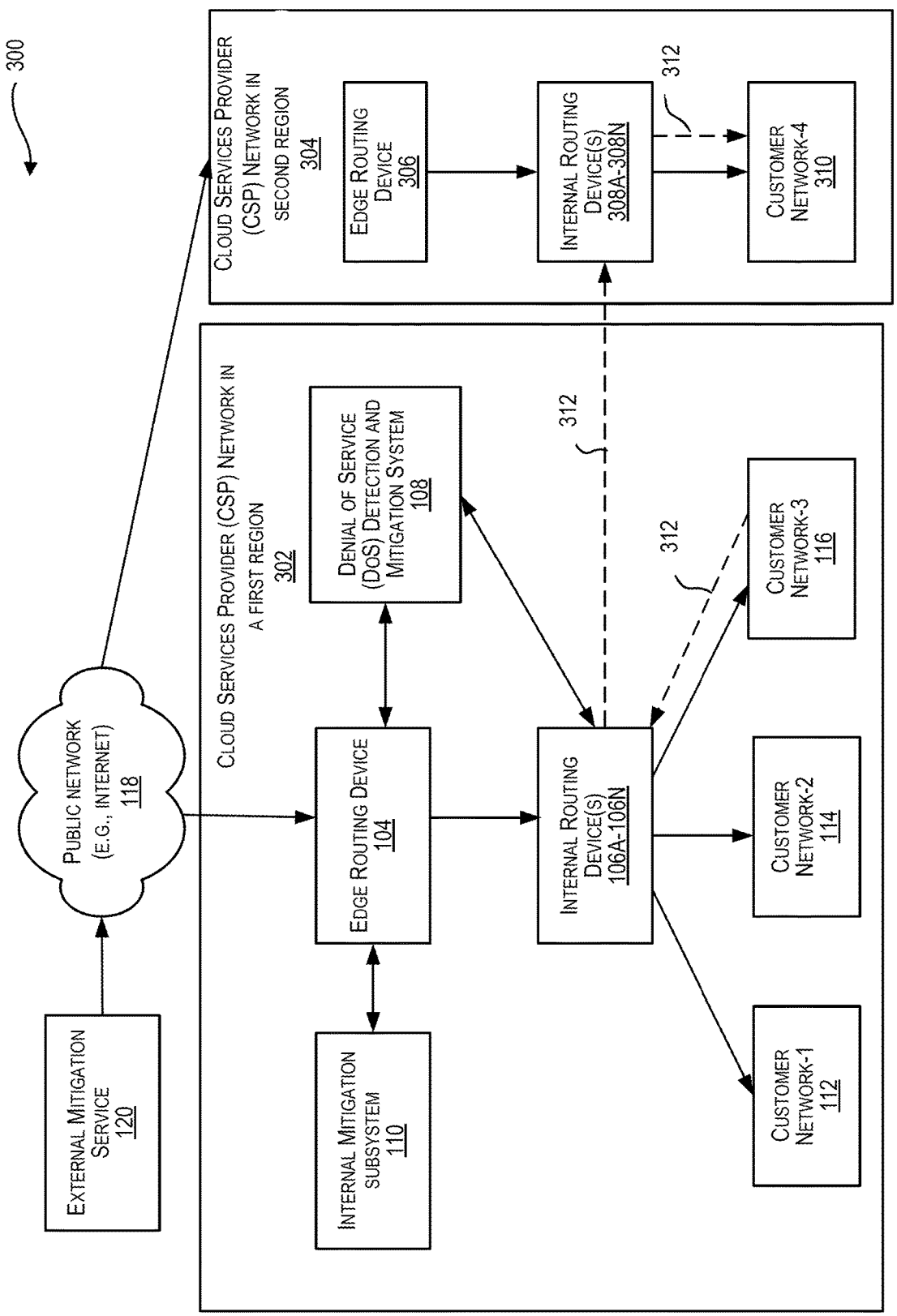

FIG. 3 is a high level diagram of a distributed environment showing a CSP network that includes capabilities for detecting and mitigating an "east-west" DoS attack within the CSP network, according to certain embodiments.

Figure 4:
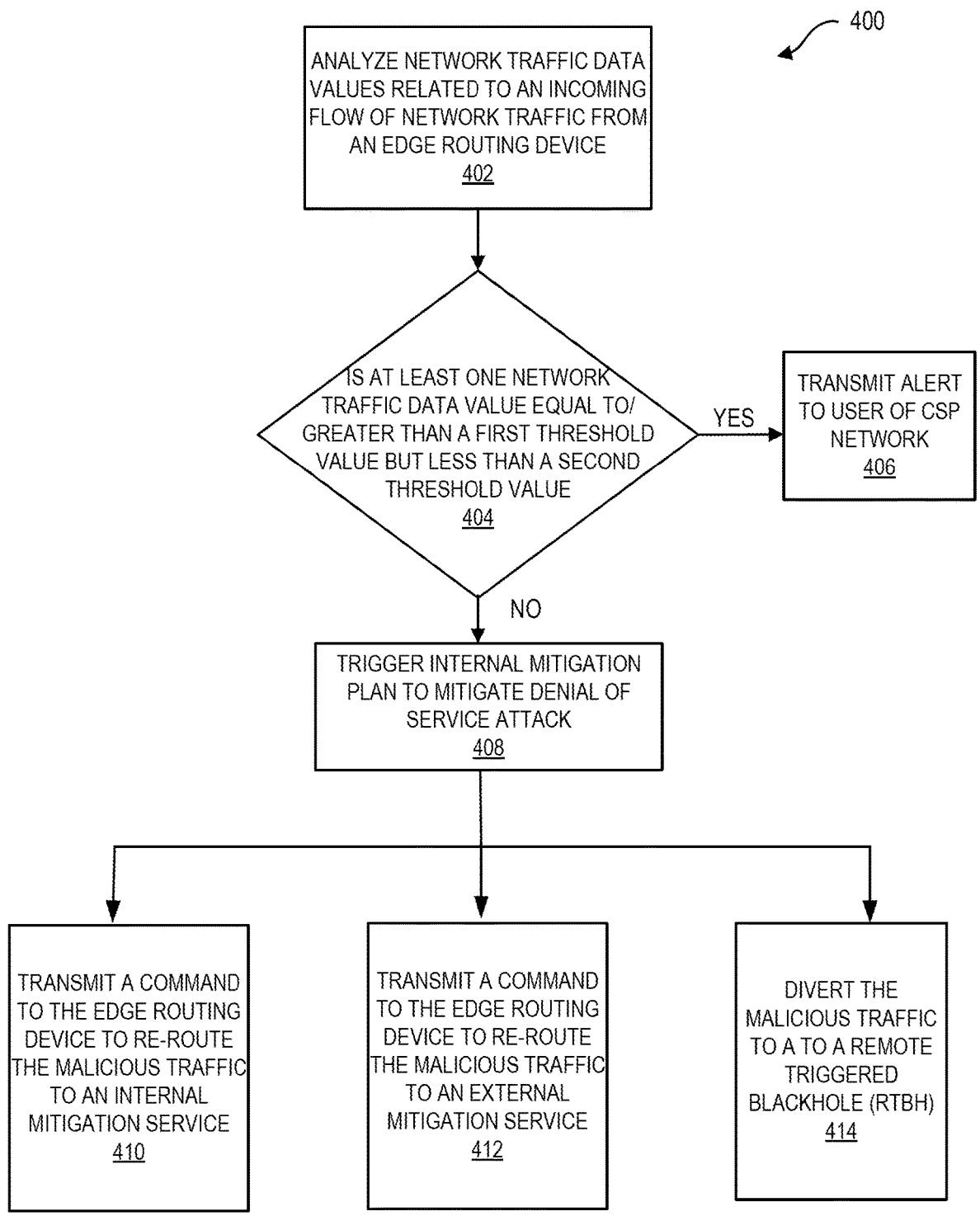

FIG. 4 is an example of a process for detecting and mitigating an "inbound" Denial of Service (DoS) attack within a CSP network, according to certain embodiments.

Figure 5:
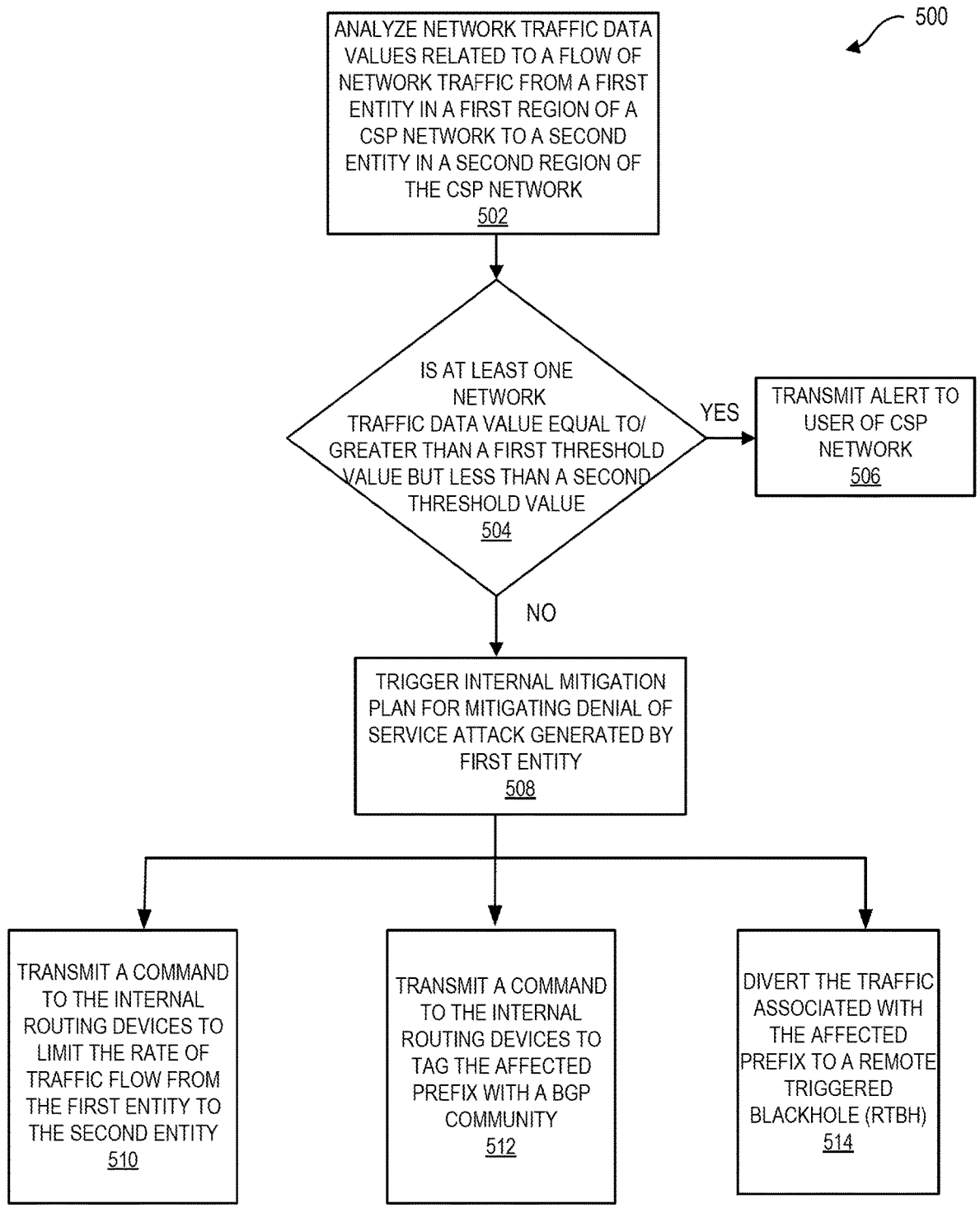

FIG. 5 is an example of a process for detecting and mitigating an "east-west" Denial of Service (DoS) attack within a CSP network, according to certain embodiments.

Figure 6:
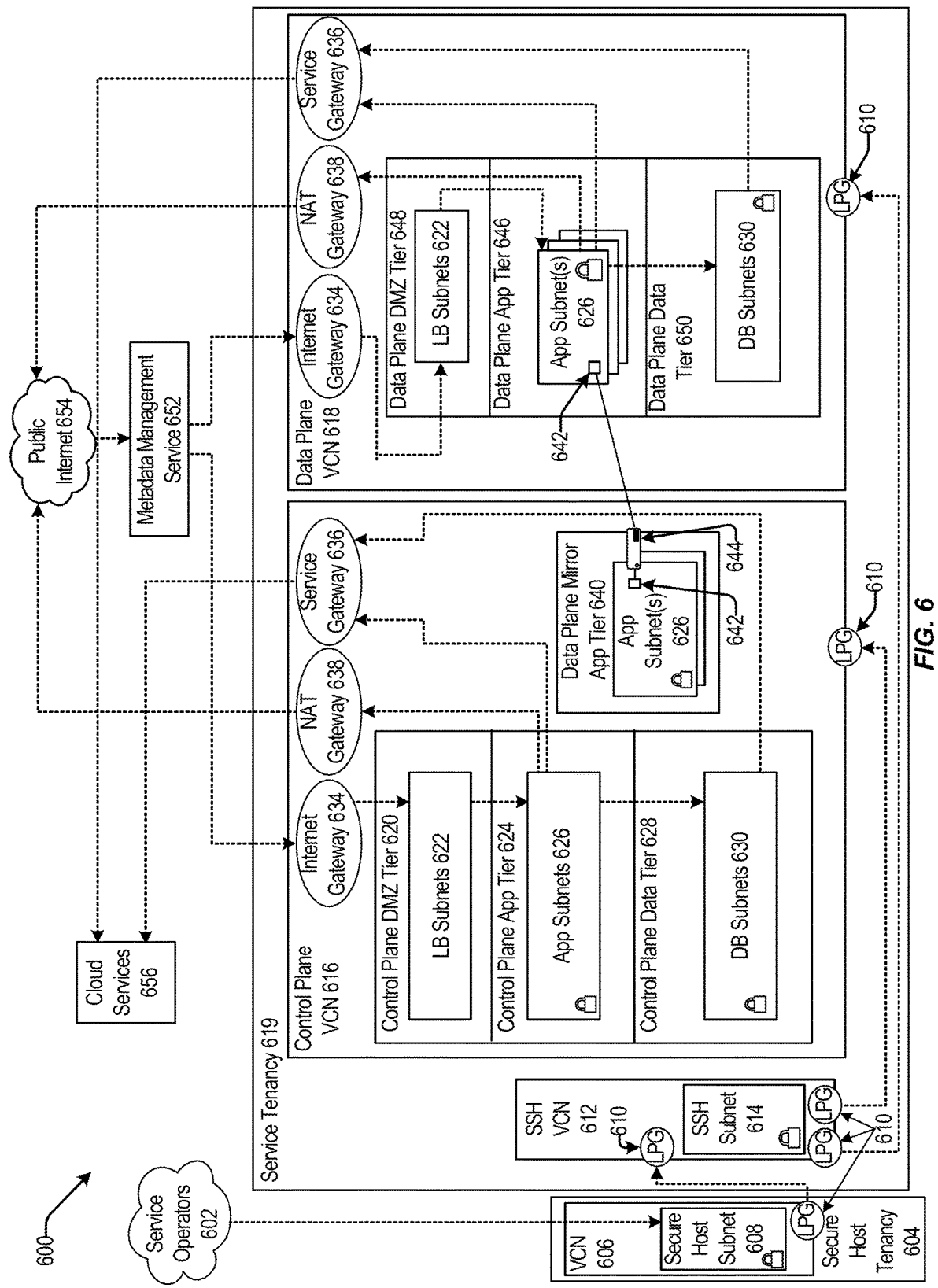

FIG. 6 is a block diagram illustrating one pattern for implementing a cloud infrastructure as a service system, according to at least one embodiment.

Figure 7:
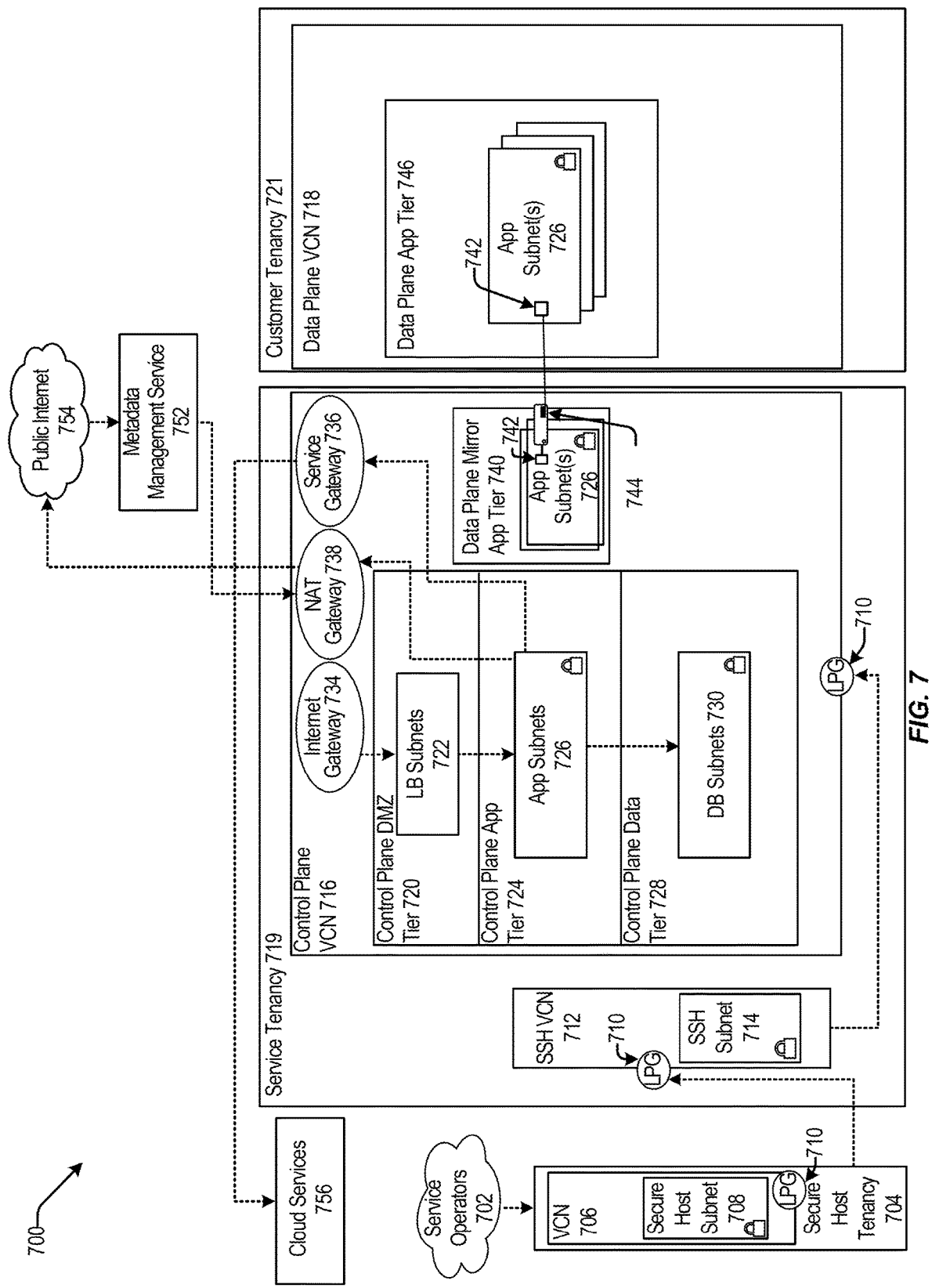

FIG. 7 is a block diagram illustrating another pattern for implementing a cloud infrastructure as a service system, according to at least one embodiment.

Figure 8:
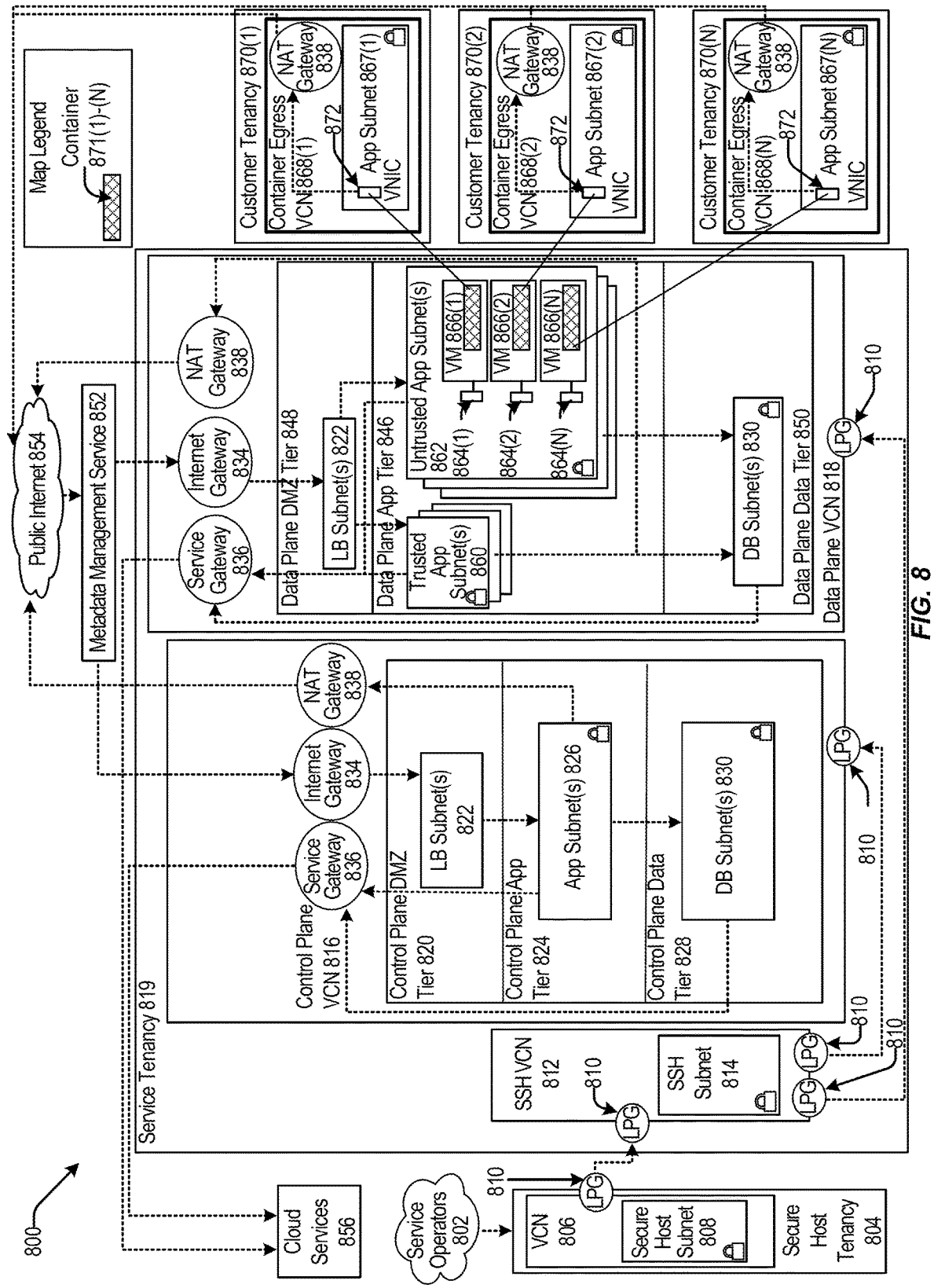

FIG. 8 is a block diagram illustrating another pattern for implementing a cloud infrastructure as a service system, according to at least one embodiment.

Figure 9:
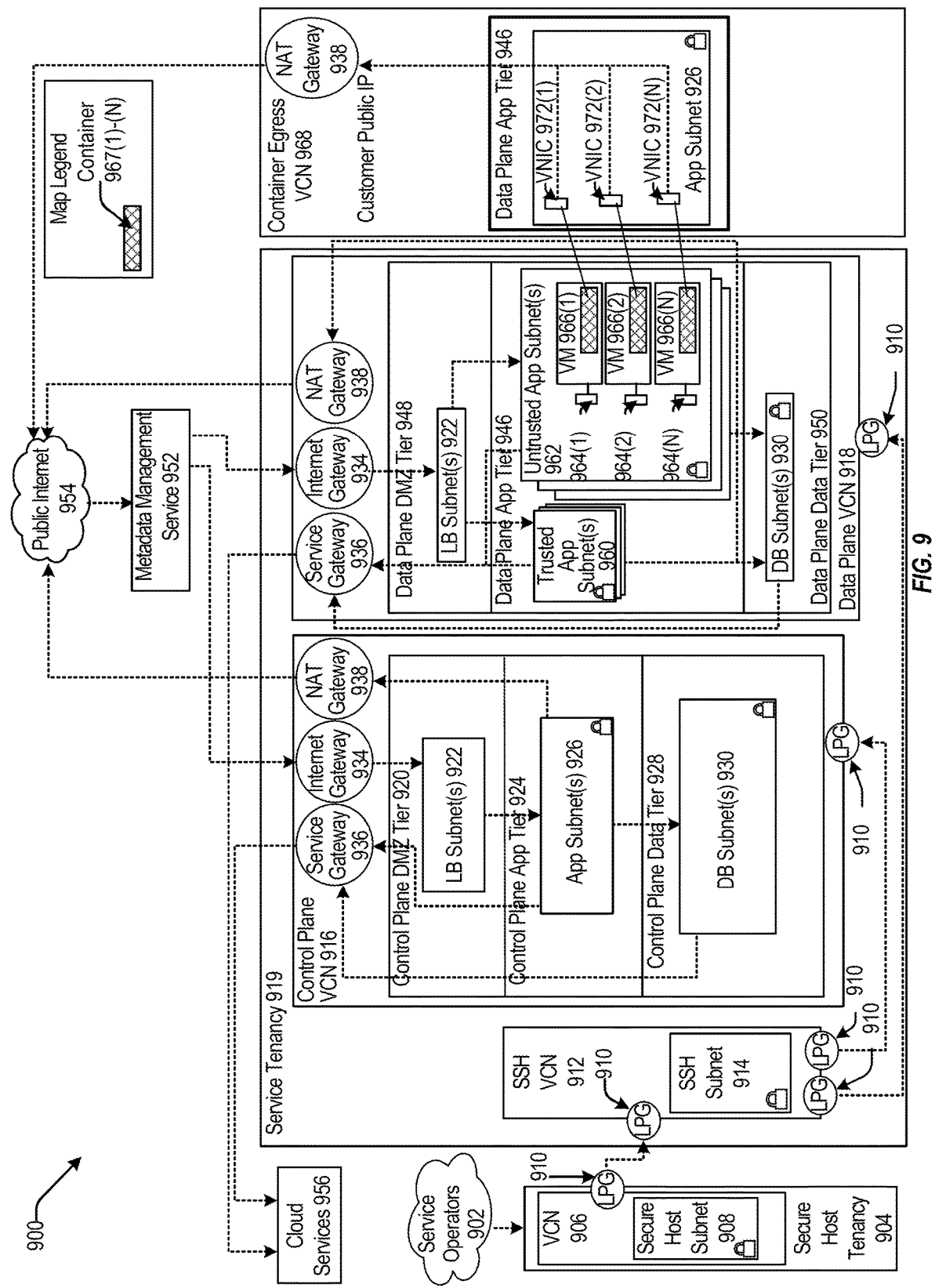

FIG. 9 is a block diagram illustrating another pattern for implementing a cloud infrastructure as a service system, according to at least one embodiment.

Figure 10:
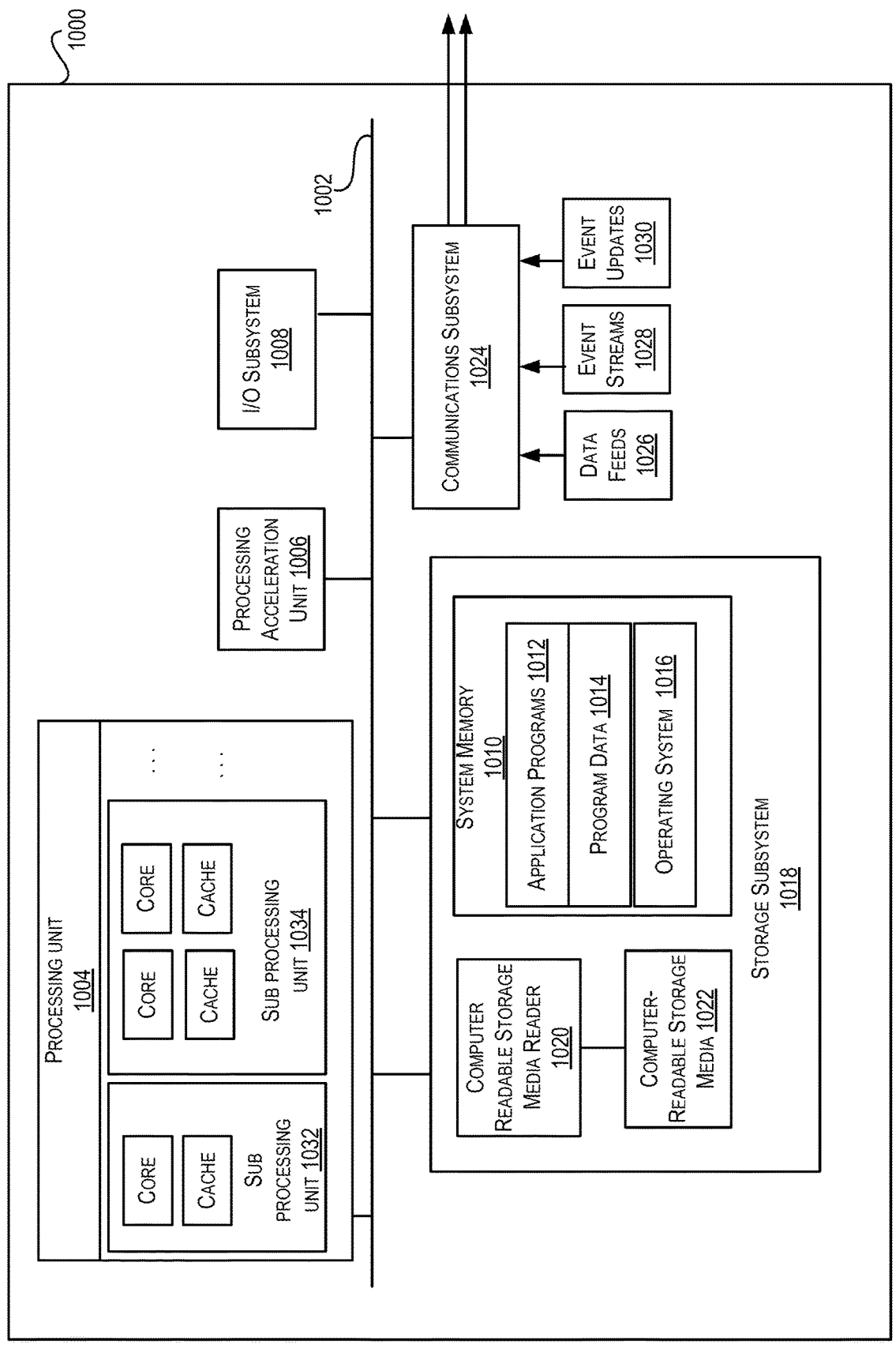

FIG. 10 is a block diagram illustrating an example computer system, according to at least one embodiment.

DETAILED DESCRIPTION

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

In a cloud-based environment, users or customers can avail of services provided by a cloud services provider (CSP) on demand (e.g., via a subscription model) using systems and infrastructure (cloud infrastructure) provided by the CSP. For instance, the CSP can provide infrastructure that can be used by customers to build their own customizable networks and deploy customer resources. The customer's resources and networks are thus hosted in a distributed computing environment by infrastructure provided by the CSP. Detecting, preventing and/or minimizing DoS attacks in such distributed computing environments can be a challenging process. Typically the detection of attacks is performed manually by a user (e.g., an administrator of the CSP network) who identifies the services and/or systems that have become unavailable and/or the entity that caused the attack within the distributed environment. For instance, the administrator may identify services and/or systems having technical problems while performing routine maintenance of the CSP network as a symptom of a DoS attack. Symptoms of a DoS attack may also detected when there is unusually slow network performance, unavailability of a system/service in the network and so on. In certain instances, the administrator may also manually analyze network flow data statistics for different sampled flows of network traffic data from devices (e.g., routers) within the computing environment to detect symptoms of DoS attacks. Oftentimes, this requires several hours of troubleshooting by the administrator before an accurate diagnosis can be made and an appropriate action be taken.

The DoS Detection and Mitigation system described in the present disclosure provides several technical advancements over existing DoS detection and mitigation capabilities available in distributed computing environments. The DoS Detection and Mitigation system described herein automatically detects and mitigates an impacting DoS attack before it can cause link saturation and/or impact the infrastructure of a distributed computing environment. The DoS Detection and Mitigation system is very flexible and dynamic in nature. It includes capabilities for analyzing network flow data statistics for different sampled flows of network traffic data within the distributed computing environment and using a set of pre-defined threshold criteria can automatically invoke various mitigation techniques. The mitigation techniques take various actions on malicious traffic by allowing only valid traffic to be forwarded back to the network and route the malicious traffic to a quarantined environment, isolating it from production.

In certain embodiments, the disclosed DoS Detection and Mitigation system includes capabilities for automatically detecting and mitigating "inbound" DoS attacks that occur as a result of network traffic data that flows into the distributed computing environment of a CSP network from an external network (e.g., the Internet). In certain embodiments, the system additionally includes capabilities for monitoring internal traffic patterns within the distributed computing environment by monitoring and analyzing network traffic data originating from entities within the network. Unlike existing detection and mitigation approaches which primarily focus on securing external traffic entering their networks, the disclosed system includes capabilities for monitoring and analyzing internal traffic patterns that have infiltrated the network for detection of anomalies and insider threats. For example, the disclosed system includes capabilities for detecting and mitigating "outbound" DoS attacks by analyzing network traffic data originating from an entity within the network to a public network (e.g., the Internet) outside the network. In certain embodiments, the disclosed system includes capabilities for automatically detecting and mitigating "east-west" DoS attacks by analyzing network traffic data originating from a first entity located in a first data center of the network to a second entity located in a second data center of the network.

Figure 1:
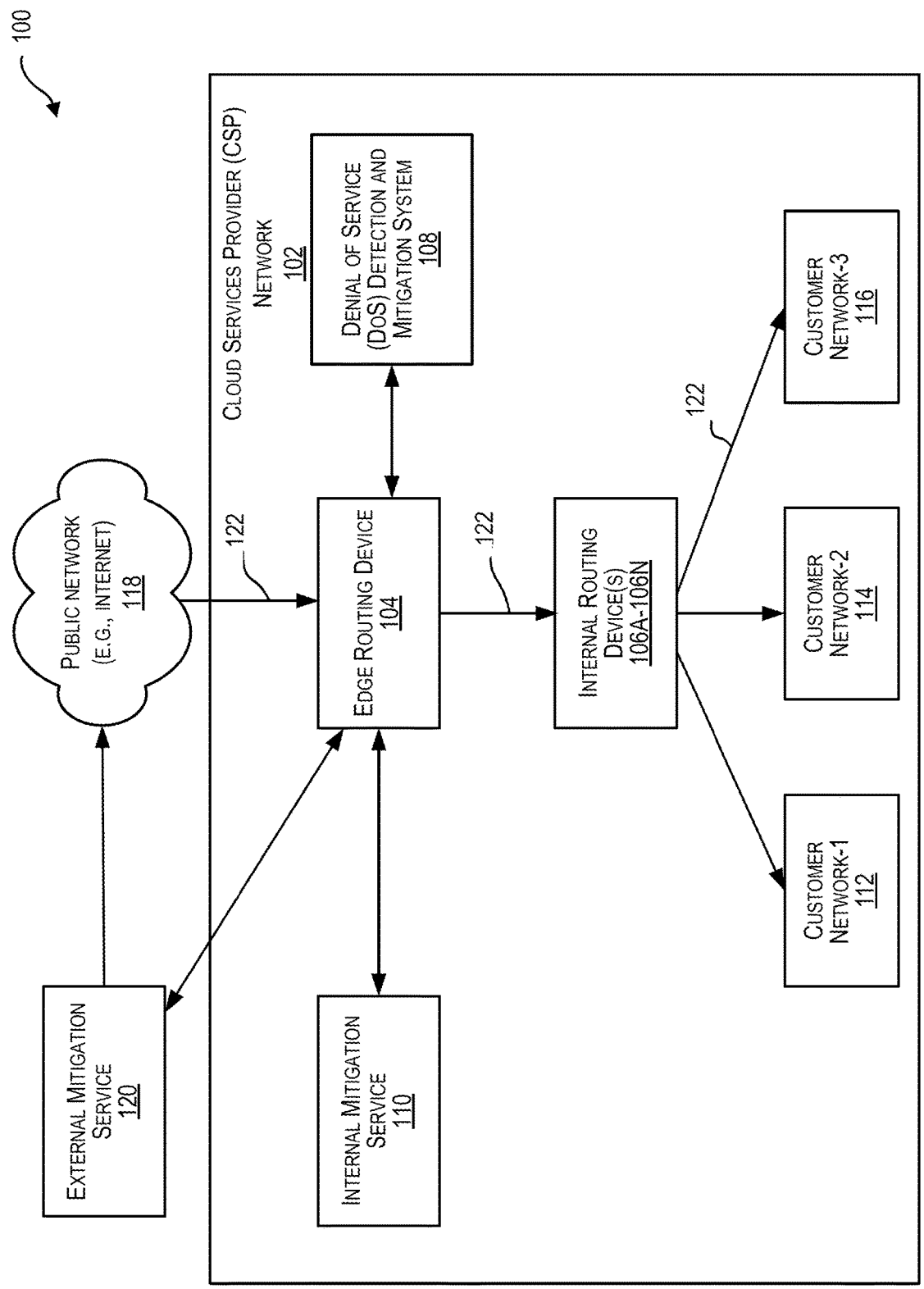
FIG. 1 depicts a high level diagram of a distributed computing environment of a cloud services provider (CSP)

Referring now to the drawings, FIG. 1 depicts a high level diagram of a distributed computing environment 100 of a cloud services provider (CSP) network 102 that includes capabilities for detecting and mitigating an inbound Denial of Service (DoS) attack within the CSP network 102, according to certain embodiments. In the embodiment shown in FIG. 1, the devices, subsystems and services that make up the infrastructure of the CSP network 102 include an edge routing device 104, a cluster of internal routing devices 106A-106N, a DoS Detection and Mitigation system 108 and an internal mitigation service 110. In certain embodiments, the CSP network 102 comprises infrastructure that can be used by customers of the CSP network 102 to build their own customizable networks (e.g., 112, 114 and 116) and deploy customer resources. The customer's resources and networks are thus hosted in a distributed environment by the infrastructure provided by the CSP network 102. The customer can use these provisioned resources to build private networks and deploy resources on these networks. In certain examples, the customer networks 112, 114 and 116 that are hosted in the cloud by the CSP network 102 are referred to herein as virtual cloud networks (VCNs). Additional details of how customers can set up one or more virtual cloud networks (VCNs) using the CSP infrastructure resources allocated for the customer is discussed in FIG. 6.

In certain embodiments, the resources of the CSP network 102 may be distributed across one or more data centers that may be geographically spread across one or more regions. For instance, in the embodiment shown in FIG. 1, the infrastructure provided by the CSP network 102 may be physically hosted in a data center in a first region (e.g., North America). The systems depicted in FIG. 1 may be implemented using software (e.g., code, instructions, program) executed by one or more processing units (e.g., processors, cores) of a computing system, hardware, or combinations thereof. The software may be stored on a non-transitory storage medium (e.g., on a memory device). The CSP network 102 depicted in FIG. 1 is merely an example and is not intended to unduly limit the scope of claimed embodiments. One of ordinary skill in the art would recognize many possible variations, alternatives, and modifications. For example, in some implementations, the CSP network 102 can be implemented using more or fewer systems, customer networks, or devices than those shown in FIG. 1, may combine two or more systems, or may have a different configuration or arrangement of systems.

In certain embodiments, the CSP network 102 provides improved capabilities for efficiently detecting and mitigating various types of DoS attacks within the CSP network 102. Types of DoS attacks detected by the CSP network 102 include, but are not limited to, Distributed DoS (DDoS) attacks where multiple systems simultaneously attack a single system so that authorized clients are not able to get to the resources in the network, volumetric DoS attacks where resources in the network is consumed by increasing the number of requests or packet sizes to exhaust server processing and overload network resources, such as bandwidth in the targeted network, volumetric DDoS attacks where the attack originates from a network of systems designed to send a high amount of traffic, or packets, to a targeted network in an effort to overwhelm its bandwidth capabilities and/or to saturate its resources and so on.

In the embodiment depicted in FIG. 1, the DoS Detection and Mitigation system 108 includes capabilities to detect an "inbound" volumetric DoS attack within the CSP network 102. The detection is performed by monitoring a flow of "incoming" network traffic data 122 as it enters the edge of the CSP network 102 from an external/public network (e.g., the Internet) 118. In an embodiment, the flow of incoming network traffic data 122 is received by an edge routing device 104 within the CSP network 102. The edge routing device 104 may be a specialized router that acts as a gateway at the edge or boundary of the CSP network 102. The edge routing device 104 includes capabilities for sending and receiving data directly to the CSP network 102 from the public network 118 or vice versa. The edge routing device 104 thus acts as a connection point between the CSP Network 102 and the public network 118 and ensures connectivity between the CSP network and the public network.

In certain examples, the edge routing device 104 may be configured with capabilities to sample a subset of the flow of inbound network traffic data 122 destined to a particular destination IP address (e.g., customer network 116) as it enters the CSP network 102. The rate at which the flow of network traffic data is sampled may be pre-configured by an administrator of the CSP network 102 while setting up the infrastructure of the CSP network 102. By way of example, the edge routing device 104 may be configured to sample only one network packet for every 1000 network packets that it receives as part of the flow of network traffic data. As used herein a "flow of network traffic data" may refer to a unidirectional stream of packets that arrive at the edge routing device 104 having the same source and destination IP addresses. In a certain implementation, the sampling may be performed by a network traffic analyzer within the edge routing device 104. By way of example, the network traffic analyzer may be implemented using the NetFlow® analyzer by Cisco Systems. The network traffic analyzer may be configured to accumulate network flow data statistics (e.g., the point of origin, destination, bandwidth, and network paths) for different flows of network traffic data samples. The accumulated network flow data statistics may subsequently be exported to a flow collection device within the edge routing device 104 for further processing by the DoS Detection and Mitigation system 108.

In certain embodiments, the DoS Detection and Mitigation system 108 may be configured to detect an "inbound" volumetric DoS attack on a customer network (e.g., 112, 114 or 116) based at least in part on analyzing the network flow data statistics from the edge routing device 104. The DoS Detection and Mitigation system 108 may utilize any standard gateway protocol (e.g., Border Gateway Protocol (BGP)) to communicate with the edge routing device 104 for the exchange of routing and reachability information to perform its analysis. In certain examples, the analysis may involve, obtaining by the DoS Detection and Mitigation system 108, network traffic data statistics (values) related to a sampled flow of network traffic data such as the total duration of the sampled flow, the total number of packets in the sampled flow, the average packet size in the sampled flow, the inter arrival time of the packets in the sampled flow, the packet generation frequency and so on.

Based at least in part on the analysis, the DoS Detection and Mitigation system 108 may be configured to automatically detect and mitigate an impacting "inbound" volumetric DoS attack on a customer network (e.g., 112, 114 or 116) within the CSP network 102. In certain examples, the detection and mitigation is performed in two phases. In a first phase, based at least in part on the analysis of a sampled flow of network traffic data (e.g., 122) from the edge routing device 104, the DoS Detection and Mitigation system 108 may trigger a "first level alert." The "first level alert" (also referred to herein as a "low level alert") may be sent as a pre-emptive measure to a user (e.g., an administrator) of the CSP network 102 of an impacting volumetric DoS attack that may be building up that could affect a customer network or in-region infrastructure within the CSP network 102. In certain examples, the "low level alert" may be triggered by the DoS Detection and Mitigation system 108 when the packet generation frequency and/or packet size observed from the packets in a sampled flow of network traffic data meets or exceeds a first threshold value but is less than a second threshold value. The threshold values (i.e., the first and second threshold values) may be pre-configured values set by a user (e.g., an administrator) of the CSP network 102 at the time of setting up the infrastructure of the CSP network 102. The threshold values identify network traffic data values (related to the flow of network traffic data) indicative of an impacting volumetric DoS attack within the CSP network. In certain examples, the first threshold value may be a value that is within a certain percentage (e.g., within plus or minus 25%) of the upper limit of the normal packet size in a flow of network traffic data. By way of example, packets may be captured at a 1:1000 sampling rate and inspected for irregular packet sizes that may be larger or smaller than the standard 1500 byte size. In this case, the first threshold value may be met when the packet size is larger than 1875 bytes or smaller than 1125 bytes. This threshold value may be applicable to both TCP and UDP packets. Threshold values may also vary based on protocol and the inspection being applied. As an example, a 10 Gbps link could trigger an initial threshold warning ("first level alert") at 2 Gbps from any specific host generating network traffic or packet frequencies of 500 Kbps. In certain examples, a "low level alert" may also be triggered by the DoS Detection and Mitigation system 108 based on inspecting the payload of the packets with a known attack signature (or by creating a new signature) to block malicious network traffic. In certain examples, the DoS Detection and Mitigation system 108 may be configured to transmit the "low level alert" as a message to the administrator (or to a team of users) within the CSP network 102 via one or more messaging applications.

In a second phase, the DoS Detection and Mitigation system 108 may be configured to trigger a "high level alert" based at least in part on the analysis of the sampled flow of network traffic data from the edge routing device 104. For instance, the "high level alert" may be triggered by the DoS Detection and Mitigation system 108 when the packet size and/or the packet generation frequency in the sampled flow of network traffic reaches or exceeds a second threshold value. By way of example, the second threshold value may be set to a value that is within a certain percentage (e.g., within plus or minus 50%) of the upper limit of the normal packet size. Using the example above, a 10 Gbps link could trigger a "high level alert" at 4 Gbps from any specific host that is generating network traffic or packet frequencies of 1 Mbps. When the DoS Detection and Mitigation system 108 triggers a "high level alert," it automatically activates an internal mitigation plan to mitigate the attack before the attack can cause link saturation or impact the infrastructure of the CSP network 102. In certain examples, the internal mitigation plan may identify a set of one or more actions for mitigating the attack. Each action may implement a specific mitigation technique on the malicious traffic by allowing only valid traffic to be forwarded back to the network while routing malicious traffic to a quarantined environment and isolating it from production.

For instance, if the DoS Detection and Mitigation system 108 determines that the attack is moderate, it may automatically invoke a first action in the internal mitigation plan. A moderate attack may be determined, for example, if at least one network data traffic value (e.g., the packet size and/or packet frequency) has exceeded the second threshold value and the network bandwidth (i.e., measured by the maximum amount of data that can transferred from one point to another within the CSP network 102 in a specific amount of time) increases to a certain value within a specific amount of time. By way of example, the DoS Detection and Mitigation system 108 may determine that the attack is moderate if the network bandwidth increases from 250 bits per second to 1000 kbits per second within a few seconds and the packet size for the flow of traffic has exceeded the second threshold value. In certain examples, an impact of an attack is defined based on traffic pattern variations. Network traffic data collected via the flow collection device may provide a baseline for normal traffic behavior over time. When traffic differs from the norm, it determines the severity of unusual activity based on set thresholds of breach levels. These levels may also be set based on acceptable traffic for each region.

In certain examples, the first action in the internal mitigation plan may, for instance, involve transmitting, by the DoS Detection and Mitigation system 108, a command/instruction to the edge routing device 104 to re-route the affected prefix (i.e., IP address identifying the customer network under attack) to an internal mitigation service 110. For instance, the DoS Detection and Mitigation system 108 may be configured to inject a/32 route (indicative of the first 32 bits of the IP address) to the edge routing device 104 which gets reflected throughout the routing tables and route-reflectors of the edge routing device. The edge routing device 104 may then be configured to channel the specific IP address to the internal mitigation service 110. By way of example, the internal mitigation service 110 may utilize a platform (e.g., based on the Arbor Networks Peakflow product) that is configured with the ability to divert the malicious traffic (i.e., the/32 IP being attacked) while allowing only valid traffic to be forwarded back to the CSP network 102 thereby allowing the rest of the customers within the CSP network 102 to continue to operate without any service disruption.

If the DoS Detection and Mitigation system 108 determines that the impending attack is relatively large (e.g., the attack has potentially infrastructure impacting effects or may cause link saturation) or if the attack cannot effectively be mitigated by the internal mitigation subsystem 110, the DoS Detection and Mitigation system 108 may automatically invoke a second action in the internal mitigation plan. The second action may involve, for instance, transmitting, by the DoS Detection and Mitigation system 108, an instruction to the edge routing device 104 to divert/re-route the malicious traffic to an upstream (external) mitigation service 120 that includes capabilities for monitoring the flow of network traffic directly through the edge routing device 104. The instructions may involve exchanging routing and reachability information with the edge routing device 104, performing constant routing change lookups for the IP address under attack through route-view services provided by BGP, tagging the affected prefix with a BGP Community (e.g., a number value that the edge routing device uses like a tag) that will send a command to the edge routing device 104 to automatically re-route the more specific IP address being attacked to the external mitigation service 120 prior to it re-entering the CSP network, performing route verification/leak checks and so on. In certain examples, the external mitigation service 120 may be provided by a third-party flow-based monitoring service (e.g., Akamai's Prolexic Flow-Based Monitoring) that provides services for mitigating DoS attacks by directly monitoring the flow of network traffic through the edge routing device 104 before it enters the CSP network 102.

If the attack is determined to be critical, requires immediate action and/or cannot be handled either by the internal mitigation service 110 or the external mitigation service 120, the DoS Detection and Mitigation system 108 may invoke a third action in the internal mitigation plan. This action may involve transmitting an instruction to the edge routing device to divert the traffic identifying the IP address under duress to a Remote triggered Blackhole (RTBH). RTBH is a filtering technique that may be used to effectively mitigate volumetric DoS attacks by filtering undesirable traffic even before it enters a protected network. Once an attack has been detected, RTBH filtering can be used to drop all attack traffic at the edge of the CSP network 102, based on either destination or source IP addresses.

Thus, by using a set of pre-defined threshold criteria, the disclosed DoS Detection and Mitigation system 108 may be configured to automatically invoke various mitigation techniques to take actions on malicious traffic by allowing only valid traffic to be forwarded back to the network and routing the malicious traffic to a quarantined environment, isolating it from production. In a traditional distributed environment without specific DoS detection techniques in place, DoS detection and mitigation is conventionally performed manually. As previously described, for instance, the detection is usually performed by a user (e.g., an administrator) within the CSP network 102 who has to manually identify the services and/or systems that have become unavailable and/or identify the entity (i.e., origin) that caused the attack. This may take several hours of troubleshooting by the administrator before a correct diagnosis can be made. For instance, the administrator may manually analyze network flow data statistics for different sampled flows of network traffic data from the edge routing device 104 before making an accurate diagnosis. Upon detecting an attack, the administrator then issues a command to a third party service (e.g., the internal mitigation service 110) to divert the malicious traffic to a quarantined environment and isolating it from production.

The DoS Detection and Mitigation system 108 described in the present disclosure provides several technical advancements over existing DoS detection and mitigation capabilities available in distributed computing environments. The DoS Detection and Mitigation system described herein automatically detects and mitigates an impacting DoS attack before it can cause link saturation and/or impact the infrastructure of a distributed computing environment. The disclosed technique additionally eliminates the need for a user (e.g., an administrator) of the CSP network 102 to manually analyze network flow data statistics for different sampled flows of network traffic data and/or to communicate with a third party service to make decisions about the appropriate action to take when an attack is detected.

In certain embodiments such as the embodiment depicted in FIG. 1, the DoS Detection and Mitigation system 108 included capabilities for detecting and mitigating an "inbound" volumetric DoS attack within the CSP network 102 by analyzing an "incoming" flow of network traffic data received from an external network (e.g., the Internet) 118 and directed to a particular destination address (e.g., a customer network, 112, 114 or 116) within the CSP network 102. However, in certain situations, the computing instance that is generating the malicious network traffic may originate from within the CSP network 102 itself. For example, the malicious traffic may originate from an entity such as a customer network (e.g., 112, 114 or 116) within the CSP network 102. Such an entity may overwhelm the CSP network 102 by generating a flood of "outgoing" network traffic data making the CSP network 102 and/or some of its services unavailable. In certain embodiments, and as will be described in detail in FIG. 2, the DoS Detection and Mitigation system 108 additionally includes capabilities for detecting and mitigating "outbound" volumetric DoS attacks by analyzing an "outgoing" flow of network traffic originating from a customer network. The DoS Detection and Mitigation system 108 automatically invokes various mitigation techniques to take action on the malicious traffic based at least in part on the analysis.

FIG. 2 is a high level diagram of a distributed environment 200 showing a CSP network 102 that includes capabilities for detecting and mitigating an "outbound" DoS attack within the CSP network 102, according to certain embodiments. In the embodiment depicted in FIG. 2, an "outgoing" flow of network traffic data 202 originates from a customer network 116. The "outgoing" flow 202 natively flows from the customer network 116 to a cluster of internal routing devices 106A-106N within the CSP network 102 that are configured to intercept and sample the flow 202 prior to transmitting the network traffic data to an endpoint (e.g., the Internet 118) outside the CSP network 102. Since the "outgoing" flow 202 from the customer network 116 natively flows towards the cluster of internal routing devices 106A-106N, the internal routing devices may be configured with capabilities to monitor a subset (or a sample) of the outgoing flow 202 as it leaves the CSP network 116. In a certain implementation, the cluster of internal routing devices 106A-106N may include a network traffic analyzer (similar to the network traffic analyzer described in FIG. 1) for sampling and accumulating network flow data statistics for different outbound flows of network traffic data. The accumulated network flow data statistics may subsequently be exported to a flow collection device within the internal routing devices 106A-106N for further processing by the DoS Detection and Mitigation system 108.

In certain embodiments, the DoS Detection and Mitigation system 108 may be configured to detect and mitigate an "outbound" volumetric DoS attack originating from a customer network (e.g., 116) by analyzing the network flow data statistics for the sampled outgoing flow 202 from the internal routing devices 106A-106N. The DoS Detection and Mitigation system 108 may utilize any standard gateway protocol (e.g., BGP) to communicate with the internal routing devices 106A-106N for the exchange of routing and reachability information to perform its analysis. As previously described in the description of FIG. 1, the analysis may involve, obtaining by the DoS Detection and Mitigation system 108, network flow data statistics related to the sampled flow 202 such as the total duration of the sampled flow, the total number of packets in the sampled flow, the average packet size in the sampled flow, the inter arrival time of the packets in the sampled flow, the packet generation frequency and so on.

Based at least in part on the analysis, the DoS Detection and Mitigation system 108 may be configured to automatically detect and mitigate an "outbound" volumetric DoS attack originating from the customer network 116. In certain examples, the detection and mitigation may be performed in a manner similar to the technique described in FIG. 1 for inbound attacks. For instance, in a first phase, based at least in part on the analysis of a sampled outgoing flow of network traffic data from a customer network, the DoS Detection and Mitigation system 108 may trigger a "low level alert." The "low level alert" may be indicative of a pre-emptive measure of any potential "outbound" volumetric DoS attack that may be building up that could affect the in-region infrastructure and/or services within the CSP network 102. For instance, a "low level alert" may be triggered by the DoS Detection and Mitigation system 108 when the packet generation frequency and/or packet size observed from a sampled outgoing flow of network traffic data from a customer network (e.g., 112, 114 or 116) meets or exceeds a first threshold value but is less than a second threshold value. The threshold values may be pre-configured by an administrator of the CSP network 102 while setting up the infrastructure of the CSP network 102. The "low level alert" may be transmitted as a message to the administrator of the CSP network 102.

In a second phase, the DoS Detection and Mitigation system 108 may be configured to trigger a "high level alert" based at least in part on the analysis of the sampled outgoing flow of network traffic data from the cluster of internal routing devices 106A-106N. For instance, the "high level alert" may be triggered by the DoS Detection and Mitigation system 108 when the packet size and/or the packet generation frequency in the sampled flow of network traffic reaches or exceeds a second threshold value. When the DoS Detection and Mitigation system 108 triggers a "high level alert," it automatically activates an internal mitigation plan to mitigate the "outbound" volumetric DoS attack before the attack can cause link saturation or impact the infrastructure of the CSP network 102. The internal mitigation plan may identify a set of one or more actions for mitigating the attack. For instance, in this embodiment, a first action to mitigate an "outbound" volumetric DoS attack may involve, transmitting, by the DoS Detection and Mitigation system 108 a command/instruction to the internal routing devices 106A-106N to limit the rate of the outgoing flow of network traffic data from the customer network to be within a pre-set rate limit threshold. By way of example, for a volumetric DoS attack identified as a DoS amplification attack, the pre-set rate limit threshold may be in the range of 200 Mbps-4 Gbps, for a volumetric DoS attack identified as a DNS (Domain Name Server) amplification attack, the pre-set rate limit threshold may be in the range of 60 Kpps-600 Kpps, for a volumetric DoS attack identified as an NTP (Network Time Protocol) amplification attack, the pre-set rate limit threshold may be in the range of 100 Kpps-1 Mpps, for a volumetric DoS attack identified a TCP SYN/ACK amplification attack, the pre-set rate limit threshold may be in the range of 100 Kpps-2 Mpps, for a volumetric DoS attack identified a UDP attack, the pre-set rate limit threshold may be in the range of 200 Mpps-4 Gpps, for an ICMP (Internet Control Message Protocol) fragmentation attack, the pre-set rate limit threshold may be in the range of 60 Kpps-250 Kpps, for an IP fragment attack, the pre-set rate limit threshold may be in the range of 60 Kpps-250 Kpps and so on.

A second action may involve, transmitting, by the DoS Detection and Mitigation system 108, a command to the internal routing devices 106A-106N to tag the affected prefix with a BGP community to take action only on the prefix generating the attack (for e.g., by blocking the flow of network traffic data transmitted from the first entity) while allowing the rest of the customers in that production environment to continue to operate without any service disruption. If the attack is determined to be critical, requires immediate action and/or cannot be handled by the internal routing devices, the DoS Detection and Mitigation system 108 may invoke a third action in the internal mitigation plan. This action may involve transmitting an instruction to the cluster of internal routing devices to completely block the traffic by identifying the IP address under duress and diverting the traffic to a Remote triggered Blackhole (RTBH).

The systems depicted in FIG. 2 may be implemented using software (e.g., code, instructions, program) executed by one or more processing units (e.g., processors, cores) of a computing system, hardware, or combinations thereof. The software may be stored on a non-transitory storage medium (e.g., on a memory device). The CSP network 102 depicted in FIG. 2 is merely an example and is not intended to unduly limit the scope of claimed embodiments. One of ordinary skill in the art would recognize many possible variations, alternatives, and modifications. For example, in some implementations, the CSP network 102 can be implemented using more or fewer systems, devices, and/or customer networks than those shown in FIG. 2, may combine two or more systems, or may have a different configuration or arrangement of systems.

In the embodiments depicted in FIG. 1 and FIG. 2, the infrastructure provided by the CSP network 102 was physically hosted in a single data center in a region (e.g., North America). In alternate embodiments, the resources of the CSP network 102 may be spread across one or more data centers that may be geographically spread across one or more regions. For instance, the infrastructure provided by the CSP network 102 may be physically hosted in two data centers in two different regions, North America and Europe. In certain embodiments, the DoS Detection and Mitigation system 108 includes capabilities for detecting and mitigating volumetric DoS attacks within the CSP network that occur as a result of network traffic data that flows in an "east-west" direction within the CSP network. As used herein, "east-west" network traffic data refers to traffic that flows between one or more entities within a data center of the CSP network or between entities in two different data centers of the CSP network. For instance, "east-west" network traffic data may refer to traffic that flows from a first entity (e.g., a first customer network) in a first data center of the CSP network located in a first region to a second entity (e.g., a second customer network) in a second data center of the CSP network located in a second region.

Thus, in addition to detecting and mitigating DoS attacks that occur as a result of network traffic data that flows in the "north-south" direction or in the "south-north" direction within the CSP network described in FIGS. 1 and 2 which typically indicates the flow of network traffic data from a public network to a data center of the CSP network and vice versa, the DoS Detection and Mitigation system 108 includes capabilities for detecting and mitigating DoS attacks that occur as a result of "east-west" network traffic data between entities located in different data centers of the CSP network.

The DoS Detection and Mitigation system 108 described in the present disclosure provides several technical advancements over conventional networking environments that at best include capabilities for detecting and mitigating "inbound" DoS attacks that occur as a result of network traffic data that flows in the "north-south" direction. By including capabilities to detect and mitigate "outbound" DoS attacks that occur as a result of network traffic data that flows in the "south-north" direction as well "east-west" DoS attacks that occur as a result of network traffic data that flows in the "east-west" direction, internal traffic patterns within the distributed computing environment that have infiltrated the network can be monitored for detection of anomalies and insider threats. Visibility into east-west traffic is critical for organizations to determine the best security practices for their networks and data centers. While many organizations tend to focus on securing external traffic that enters their networks, it is increasingly important for organizations to monitor internal traffic patterns for malware that has infiltrated the network and insider threats. The embodiment shown in FIG. 3 describes the capabilities of the DoS Detection and Mitigation system 108 for detecting and mitigating DoS attacks that occur as a result of "east-west" network traffic data between entities located in different data centers of the CSP network.

FIG. 3 is a high level diagram of a distributed environment 300 showing a CSP network 102 that includes capabilities for detecting and mitigating an "east-west" DoS attack within the CSP network, according to certain embodiments. In the embodiment depicted in FIG. 3, a first entity (e.g., customer network 116) deployed in a first data center in a first region 302 of the CSP network transmits a flow of network traffic data 312 to a second entity (e.g., customer network 310) deployed in a second data center in a second region 304 of the CSP network. The "east-west" flow of network traffic data 312 natively flows from the customer network 116 to a cluster of internal routing devices 106A-106N located in the CSP network in the first region 302 that are configured to intercept and sample the flow 312 prior to transmitting the network traffic data to an endpoint (e.g., a cluster of internal routing devices 308A-308N) located in a second region 304 of the CSP network. In certain examples, the cluster of internal routing devices 106A-106N in the first region 302 may be configured with capabilities to monitor a subset (or a sample) of the flow 312 as it leaves the first region 302 of the CSP network. In a certain implementation, the cluster of internal routing devices 106A-106N may include a network traffic analyzer (similar to the network traffic analyzer described in FIGS. 1 and 2) that includes capabilities for sampling and accumulating network flow data statistics for "east-west" flows of network traffic data. The accumulated network flow data statistics may subsequently be exported to a flow collection device within the internal routing devices 106A-106N for further processing by the DoS Detection and Mitigation system 108.

In certain embodiments, the DoS Detection and Mitigation system 108 may be configured to detect an "east-west" volumetric DoS attack originating from a customer network (e.g., 116) located in a first region 302 of the CSP network by analyzing network flow data statistics for the sampled flow 312 from the internal routing devices 106A-106N. The DoS Detection and Mitigation system 108 may utilize any standard gateway protocol (e.g., BGP) to communicate with the internal routing devices 106A-106N for the exchange of routing and reachability information to perform its analysis. As previously described in the description of FIGS. 1 and 2, the analysis may involve, obtaining by the DoS Detection and Mitigation system 108, network flow data statistics related to the sampled flow 312 such as the total duration of the sampled flow, the total number of packets in the sampled flow, the average packet size in the sampled flow, the inter arrival time of the packets in the sampled flow, the packet generation frequency and so on.

Based at least in part on the analysis, the DoS Detection and Mitigation system 108 may be configured to automatically detect and mitigate an "east west" volumetric DoS attack originating from the customer network 116 in the first region 302 to a different customer network 310 in a second region 304 of the CSP network. In certain examples, the detection and mitigation may be performed in a manner similar to the technique described for detecting and mitigating an "outbound volumetric DoS" attack described in FIG. 2. For instance, in a first phase, based at least in part on the analysis of a sampled "east-west" flow of network traffic data from the first customer network (e.g., 116) to the second customer network (e.g., 310), the DoS Detection and Mitigation system 108 may trigger a "low level alert." The "low level alert" may be indicative of a pre-emptive measure of any potential "outbound" DoS attack that may be building up that could affect the in-region infrastructure within the CSP network in the first region 302. For instance, a "low level alert" may be triggered by the DoS Detection and Mitigation system 108 when the packet generation frequency and/or packet size observed from a sampled flow of network traffic data from a customer network (e.g., 112, 114 or 116) meets or exceeds a first threshold value but is less than a second threshold value. The threshold values may be pre-configured by an administrator of the CSP network 102 while setting up the infrastructure of the CSP network 102. The "low level alert" may be transmitted as a message to the administrator of the CSP network 102.

In a second phase, the DoS Detection and Mitigation system 108 may be configured to trigger a "high level alert" based at least in part on the analysis of the sampled flow of network traffic data from the cluster of internal routing devices 106A-106N. For instance, the "high level alert" may be triggered by the DoS Detection and Mitigation system 108 when the packet size and/or the packet generation frequency (packets per second or bytes per second) reaches or exceeds a second threshold value. The second threshold value may be pre-configured by an administrator of the CSP network 102 while setting up the infrastructure of the CSP network 102. When the DoS Detection and Mitigation system 108 triggers a "high level alert," it automatically activates an internal mitigation plan to mitigate the "east-west" DoS attack before the attack can cause link saturation or impact the infrastructure of the CSP network 102. The internal mitigation plan may identify a set of one or more actions for mitigating the attack. For instance, in this embodiment, a first action to mitigate an "east-west" volumetric DoS attack may involve, transmitting, by the DoS Detection and Mitigation system 108 a command/instruction to the internal routing devices 106A-106N to limit the rate of flow of network traffic data from the first customer network 116 to be within a pre-set rate limit threshold. A second action may involve, transmitting, by the DoS Detection and Mitigation system 108, a command to the internal routing devices 106A-106N to tag the affected prefix with a BGP community to take action only on the prefix generating the attack (for e.g., by blocking the flow of network traffic data transmitted from the first entity) while allowing the rest of the customers in that production environment to continue to operate without any service disruption.

If the attack is determined to be critical, requires immediate action and/or cannot be handled either by the internal routing devices, the DoS Detection and Mitigation system 108 may invoke a third action in the internal mitigation plan. This action may involve transmitting an instruction to the cluster of internal routing devices to completely block/divert the traffic by identifying the IP address under duress and diverting the traffic to a Remote triggered Blackhole (RTBH).

The systems depicted in FIG. 3 may be implemented using software (e.g., code, instructions, program) executed by one or more processing units (e.g., processors, cores) of a computing system, hardware, or combinations thereof. The software may be stored on a non-transitory storage medium (e.g., on a memory device). The CSP network located in the first region 302 and the second region 304 depicted in FIG. 3 are merely examples and are not intended to unduly limit the scope of claimed embodiments. One of ordinary skill in the art would recognize many possible variations, alternatives, and modifications. For example, in some implementations, the CSP network can be implemented using more or fewer subsystems, more or fewer customer networks and in more or fewer regions than those shown in FIG. 3, may combine two or more systems, or may have a different configuration or arrangement of systems.

FIG. 4 is an example of a process for detecting and mitigating an "inbound" Denial of Service (DoS) attack within a CSP network, according to certain embodiments. The processing depicted in FIG. 4 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 400 presented in FIG. 4 and described below is intended to be illustrative and non-limiting. Although FIG. 4 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 4 may be performed by the DoS Detection and Mitigation system 108.

The processing depicted in FIG. 4 is initiated at block 402 when the DoS Detection and Mitigation system 108 analyzes network traffic data values related to a flow of network traffic data from an edge routing device (e.g., 104) within the CSP network (e.g., 102). As previously described, the analysis may involve, obtaining by the DoS Detection and Mitigation system 108, network traffic data statistics (values) related to a sampled flow of network traffic data such as the total duration of the sampled flow, the total number of packets in the sampled flow, the average packet size in the sampled flow, the inter arrival time of the packets in the sampled flow, the packet generation frequency and so on.

At block 404, the DoS Detection and Mitigation system 108 performs a check to determine that at least one network traffic data value is equal to or greater than a first threshold value but less than a second threshold value. The threshold values (i.e., the first and second threshold value) identify network traffic data values (e.g., packet size, packet generation frequency and so on related to the flow of network traffic data) indicative of an impacting volumetric DoS attack within the CSP network. The threshold values may be pre-configured values set by a user (e.g., an administrator) of the CSP network 102 at the time of setting up the infrastructure of the CSP network 102.

If the network traffic data value is equal to or greater than a first threshold value but less than a second threshold value, at block 406, the DoS Detection and Mitigation system 108 transmits an alert (e.g., a low level alert) to a user (e.g., an administrator) of the CSP network. As previously described, the low level alert may be sent as a pre-emptive measure to an administrator of the CSP network 102 of an impacting volumetric DoS attack that may be building up that could affect a customer network or in-region infrastructure within the CSP network 102. For example, the "low level alert" may be transmitted as a message to the administrator (or to a team of users) within the CSP network 102 via one or more messaging applications.

If the network traffic data value is greater than a second threshold value, at block 408, the DoS Detection and Mitigation system 108 triggers an internal mitigation plan to mitigate the DoS attack. The internal mitigation plan may identify a set of one or more actions for mitigating the attack. For example, a first option at block 410 may involve, transmitting, by the DoS Detection and Mitigation system 108, a command to the edge routing device 104 to re-route the affected prefix (i.e., IP address identifying the customer network under attack) to an internal mitigation service (e.g., 110). A second option at block 412 may involve, transmitting, by the DoS Detection and Mitigation system 108, an instruction/command to the edge routing device 104 to divert/re-route the malicious traffic to an upstream (external) mitigation service (e.g., 120). A third option at block 414 may involve diverting the traffic identifying the IP address under duress to a Remote triggered Blackhole (RTBH).

FIG. 5 is an example of a process for detecting and mitigating an "east-west" Denial of Service (DoS) attack within a CSP network, according to certain embodiments. The processing depicted in FIG. 5 may be implemented in software only (e.g., code, instructions, program) executed by one or more processing units (e.g., processors, cores) of the respective systems, hardware only, or combinations thereof. The software may be stored on a non-transitory storage medium (e.g., on a memory device). The process 500 presented in FIG. 5 and described below is intended to be illustrative and non-limiting. Although FIG. 5 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 3, the processing depicted in FIG. 5 may be performed by the DoS Detection and Mitigation system 108.

The processing depicted in FIG. 5 is initiated at block 502 when the DoS Detection and Mitigation system 108 analyzes network traffic data values related to a flow of network traffic data from a cluster of internal routing devices (e.g., 106A-106N). For example, the flow of network traffic data may be transmitted by a first entity (e.g., a customer network 116) deployed in a first region 302 of the CSP network to a second entity (e.g. a customer network 310) deployed in a second region 304 of the CSP network. As previously described, the analysis may involve, obtaining by the DoS Detection and Mitigation system 108, network traffic data statistics (values) related to a sampled flow of network traffic data from the first entity such as the total duration of the sampled flow, the total number of packets in the sampled flow, the average packet size in the sampled flow, the inter arrival time of the packets in the sampled flow, the packet generation frequency and so on.

At block 504, the DoS Detection and Mitigation system 108 performs a check to determine that at least one network traffic data value is equal to or greater than a first threshold value but less than a second threshold value. The threshold values (i.e., the first and second threshold value) identify network traffic data values (e.g., packet size, packet generation frequency and so on related to the flow of network traffic data) indicative of an impacting volumetric DoS attack within the CSP network. The threshold values may be pre-configured values set by a user (e.g., an administrator) of the CSP network 102 at the time of setting up the infrastructure of the CSP network 102.

If the network traffic data value is equal to or greater than a first threshold value but less than a second threshold value, at block 506, the DoS Detection and Mitigation system 108 transmits an alert (e.g., a low level alert) to a user (e.g., an administrator) of the CSP network. As previously described, the low level alert may be sent as a pre-emptive measure to an administrator of the CSP network 102 of an impacting volumetric DoS attack that may be building up that could affect a customer network or in-region infrastructure within the CSP network 102. For example, the "low level alert" may be transmitted as a message to the administrator (or to a team of users) within the CSP network 102 via one or more messaging applications.

If the network traffic data value is greater than a second threshold value, at block 508, the DoS Detection and Mitigation system 108 triggers an internal mitigation plan to mitigate the DoS attack. The internal mitigation plan, may identify a set of one or more actions for mitigating the attack. For example, in this embodiment, a first option at block 510 may involve, transmitting, by the DoS Detection and Mitigation system 108, a command to the cluster of internal routing devices to limit the rate of traffic flow from the first entity to the second entity. A second option at block 512 may involve, transmitting, by the DoS Detection and Mitigation system 108, an instruction/command to the cluster of internal routing devices to tag the affected prefix with a BGP community to take action only on the prefix generating the attack (for e.g., by blocking the flow of network traffic data transmitted from the first entity) while allowing the rest of the customers in that production environment to continue to operate without any service disruption. A third option at block 514 may involve diverting the traffic identifying the IP address under duress to a Remote triggered Blackhole (RTBH).

Example Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   for a first entity deployed in a first region of a plurality of regions of a cloud services provider network, monitoring, by a computer system, a flow of network traffic data originating from the first entity and destined to a second entity remote from the first entity, the second entity deployed in a second region of the plurality of regions of the cloud services provider network, the cloud services provider network being configured to provision a first set of infrastructure resources for deployment by at least the first entity in the first region of the cloud services provider network;

based at least in part on the monitoring, determining, by the computer system, that the flow of network traffic data originating from the first entity to the second entity exceeds a threshold value, the threshold value identifying at least one network traffic data value related to the flow of network traffic data indicative of a Denial of Service attack in the cloud services provider network, wherein the first entity is a first customer network of the cloud services provider network and the second entity is a second customer network of the cloud services provider network;

responsive to the determining, identifying, by the computer system, an action to be taken to mitigate the Denial of Service attack in the cloud services provider network; and performing, by the computer system, the action to mitigate the Denial of Service attack in the cloud services provider network.

2. The method of claim 1, wherein monitoring, by the computer system, the flow of network traffic data originating from the first entity further comprises:

analyzing, by the computer system, a plurality of network traffic data values related to the flow of network traffic data from a cluster of internal routing devices within the cloud services provider network; and based at least in part on the analysis, determining, by the computer system, that the at least one network traffic data value related to the flow of the network traffic data exceeds a first threshold value.

3. The method of claim 2, wherein the least one network traffic data value comprises at least one of a packet generation frequency or a packet size related to packets in the flow of network traffic data.

4. The method of claim 2, further comprising transmitting, by the computer system, a first alert to a user of the cloud services provider network based at least in part on determining that the at least one network traffic data value related to the flow of network traffic data exceeds the first threshold value.

5. The method of claim 2, wherein the first alert is transmitted as an email message to a user of the cloud services provider network.

6. The method of claim 4, wherein monitoring, by the computer system, the flow of network traffic data originating from the first entity further comprises:

analyzing, by the computer system, the plurality of network traffic data values related to the flow of network traffic data from the cluster of internal routing devices within the cloud services provider network; and based at least in part on the analysis, determining, by the computer system, that the at least one network traffic data value related to the flow of network traffic data exceeds a second threshold value, wherein the second threshold value is greater than the first threshold value.

7. The method of claim 6, further comprising, triggering, by the computer system, an internal mitigation plan to mitigate the Denial of Service attack based at least in part on determining that the at least one network traffic data value related to the flow of network traffic data exceeds the second threshold value.

8. The method of claim 7, wherein the internal mitigation plan identifies a set of one or more actions to mitigate the Denial of Service attack, wherein a first action in the set of one or more actions comprises transmitting, by the computer system, an instruction to the cluster of internal routing devices to limit a rate of the flow of network traffic data from the first entity to the second entity.

9. The method of claim 8, wherein a second action in the set of one or more actions comprises transmitting, by the computer system, an instruction to the cluster of internal routing devices to tag a prefix of an Internet Protocol address of the first entity to block the flow of network traffic data transmitted from the first entity to the second entity.

10. The method of claim 8, wherein a third action in the set of one or more actions comprises transmitting, by the computer system, an instruction to the cluster of internal routing devices to divert the flow of network traffic data transmitted from the first entity to a Remote triggered Blackhole (RTBH).

11. The method of claim 1, wherein the cloud services provider network is configured to provision a second set of infrastructure resources for deployment by the second entity in the second region.

12. The method of claim 1, wherein the second entity is an external entity deployed in a network external to the cloud services provider network.

13. The method of claim 1, wherein the Denial of Service attack comprises at least one of a volumetric Denial of Service attack or a volumetric Distributed Denial of Service attack in the cloud services provider network.

14. A system comprising:
a processor; and
a memory storing instructions that, when executed by the processor, configure the system to:
for a first entity deployed in a first region of a plurality of regions of a cloud services provider network, monitor a flow of network traffic data originating from the first entity and destined to a second entity remote from the first entity, the second entity deployed in a second region of the plurality of regions of the cloud services provider network, the cloud services provider network being configured to provision a first set of infrastructure resources for deployment by at least the first entity in the first region of the cloud services provider network;
based at least in part on the monitoring, determine that the flow of network traffic data originating from the first entity to the second entity exceeds a threshold value, the threshold value identifying at least one network traffic data value related to the flow of network traffic data indicative of a Denial of Service attack in the cloud services provider network, wherein the first entity is a first customer network of the cloud services provider network and the second entity is a second customer network of the cloud services provider network;
responsive to the determining, identify an action to be taken to mitigate the Denial of Service attack in the cloud services provider network; and
perform the action to mitigate the Denial of Service attack in the cloud services provider network.

15. The system of claim 14, wherein the instructions to monitor the flow of network traffic data originating from the first entity further comprises instructions to:

analyze a plurality of network traffic data values related to the flow of network traffic data from a cluster of internal routing devices within the cloud service provider network; and based at least in part on the analysis, determine that the at least one network traffic data value related to the flow of network traffic data exceeds a first threshold value.

16. The system of claim 15, further comprising instructions to transmit a first alert to a user of the cloud services provider network based at least in part on determining that the at least one network traffic data value related to the flow of network traffic data exceeds the first threshold value.

17. The system of claim 13, wherein the cloud services provider network is configured to provision a second set of infrastructure resources for deployment by the second entity in the second region.

18. A non-transitory computer-readable medium having program code that is stored thereon, the program code executable by one or more processing devices for performing operations comprising:

for a first entity deployed in a first region of a plurality of regions of a cloud services provider network, monitoring a flow of network traffic data originating from the first entity and destined to a second entity remote from the first entity, the second entity deployed in a second region of the plurality of regions of the cloud services provider network, the cloud services provider network being configured to provision a first set of infrastructure resources for deployment by at least the first entity in the first region of the cloud services provider network;

based at least in part on the monitoring, determining that the flow of network traffic data originating from the first entity to the second entity exceeds a threshold value, the threshold value identifying at least one network traffic data value related to the flow of network traffic data indicative of a Denial of Service attack in the cloud services provider network, wherein the first entity is a first customer network of the cloud services provider network and the second entity is a second customer network of the cloud services provider network;

responsive to the determining, identifying an action to be taken to mitigate the Denial of Service attack in the cloud services provider network; and performing the action to mitigate the Denial of Service attack in the cloud services provider network.

19. The computer-readable medium of claim 18, wherein the monitoring further comprises:

analyzing a plurality of network traffic data values related to the flow of network traffic data from a cluster of internal routing devices within the cloud services provider network; and based at least in part on the analysis, determining that the at least one network traffic data value related to the flow of network traffic data exceeds a first threshold value.

20. The computer-readable medium of claim 18, wherein the least one network traffic data value comprises at least one of a packet generation frequency or a packet size related to packets in the flow of network traffic data.

* * * * *

UNITED STATES PATENT AND TRADEMARK OFFICE
CERTIFICATE OF CORRECTION

PATENT NO. : 11,470,112 B2
APPLICATION NO. : 17/107573
DATED : October 11, 2022
INVENTOR(S) : Gingold et al.

It is certified that error appears in the above-identified patent and that said Letters Patent is hereby corrected as shown below:

On the Title Page

On page 2, Column 2, under item (56) Other Publications, Line 27, delete "KMPLS-TE")," and insert -- (MPLS-TE)", --, therefor.

In the Claims

In Column 33, Line 37, in Claim 3, delete "least" and insert -- at least --, therefor.

In Column 35, Line 13, in Claim 17, delete "13" and insert -- 14 --, therefor.

In Column 36, Line 27, in Claim 20, delete "least" and insert -- at least --, therefor.

Signed and Sealed this
Twenty-first Day of March, 2023

Katherine Kelly Vidal
*Director of the United States Patent and Trademark Office*